(12) United States Patent
Bloechl

(10) Patent No.: US 11,412,472 B1
(45) Date of Patent: Aug. 9, 2022

(54) SYSTEM AND METHOD FOR GENERATING PHASE-COHERENT SIGNALING VIA CALIBRATED PHASE SYNCHRONIZATION FACTORS AMONG WIRELESS RANGING NODES IN A PHASE-BASED TIME DIFFERENCE OF ARRIVAL FRAMEWORK

(71) Applicant: Link Labs, Inc., Annapolis, MD (US)

(72) Inventor: Mark O. Bloechl, Elkridge, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 17/502,338

(22) Filed: Oct. 15, 2021

(51) Int. Cl.
*G01S 13/84* (2006.01)
*H04W 56/00* (2009.01)
*H04W 64/00* (2009.01)

(52) U.S. Cl.
CPC ... *H04W 56/0015* (2013.01); *H04W 56/0035* (2013.01); *H04W 64/00* (2013.01)

(58) Field of Classification Search
CPC ........... H04W 72/0453; H04W 74/006; H04W 72/08; H04W 74/004; H04W 72/242; H04L 76/15; H04L 1/246
USPC ....................................... 370/336; 455/456.1
See application file for complete search history.

(56) References Cited

U.S. PATENT DOCUMENTS

| | | | |
|---|---|---|---|
| 5,477,199 A | 12/1995 | Montreuil | |
| 5,548,617 A | 8/1996 | Patel et al. | |
| 6,084,932 A | 7/2000 | Veintimilla | |
| 6,097,766 A | 8/2000 | Okubo et al. | |
| 6,236,675 B1 | 5/2001 | Bedingfield et al. | |
| 6,480,555 B1 | 11/2002 | Renard et al. | |
| 6,665,308 B1 | 12/2003 | Rakib et al. | |
| 6,771,590 B1 | 8/2004 | Marchok et al. | |
| 7,024,331 B2 | 4/2006 | Jones et al. | |
| 7,228,228 B2 | 6/2007 | Bartlett et al. | |
| 7,474,677 B2 | 1/2009 | Trott | |
| 9,253,727 B1 | 2/2016 | Luna et al. | |
| 9,264,099 B1 | 2/2016 | Sapio et al. | |
| 9,449,202 B2 | 9/2016 | Clare et al. | |
| 9,652,955 B1 | 5/2017 | Ray et al. | |
| 9,660,768 B2 | 5/2017 | Sapio et al. | |
| 9,775,157 B2 | 9/2017 | Luna et al. | |
| 9,860,882 B2 | 1/2018 | Sapio et al. | |
| 10,070,479 B1 | 9/2018 | Ray et al. | |
| 10,182,487 B2 | 1/2019 | Mohan et al. | |
| 10,234,536 B2 | 3/2019 | Luna et al. | |
| 10,237,913 B2 | 3/2019 | Wohler et al. | |
| 10,244,373 B2 | 3/2019 | Bloechi et al. | |
| 10,244,377 B2 | 3/2019 | Bloechi et al. | |
| 10,264,436 B1 | 4/2019 | Wohler et al. | |

(Continued)

OTHER PUBLICATIONS

U.S. Appl. No. 17/036,128, filed Sep. 2020, Bloechl.

(Continued)

*Primary Examiner* — Phuoc H Doan
(74) *Attorney, Agent, or Firm* — Charles B. Lobsenz; Brian H. Buck; Potomac Law Group, PLLC

(57) ABSTRACT

Provided are a system and method for generating phase-coherent signaling via invocation of a respective phase synchronization calibration factor among wireless communications nodes. The calibration factor substantially and simultaneously removes an effect of multipath interference and propagation phase shift as between the nodes, thus allowing a direct correlation of phase with respect thereto in a subsequent phase-based ranging regime.

14 Claims, 9 Drawing Sheets

(56) References Cited

U.S. PATENT DOCUMENTS

| | | | |
|---|---|---|---|
| 10,484,932 | B2 | 11/2019 | Bloechl et al. |
| 10,499,196 | B2 | 12/2019 | Bloechi et al. |
| 10,506,498 | B1 | 12/2019 | Bloechl et al. |
| 10,708,970 | B2 | 7/2020 | Bloechl et al. |
| 10,798,547 | B2 | 10/2020 | Gold et al. |
| 10,845,451 | B1 | 11/2020 | Bloechi |
| 10,862,520 | B1 | 12/2020 | Bloechl |
| 10,873,949 | B1 | 12/2020 | Li et al. |
| 10,887,860 | B1 | 1/2021 | Bloechi |
| 10,985,787 | B1 | 4/2021 | Bloechi |
| 10,986,467 | B1 | 4/2021 | Bloechl et al. |
| 11,105,917 | B1 | 8/2021 | Bloechl |
| 2001/0001616 | A1 | 5/2001 | Rakib et al. |
| 2007/0186258 | A1 | 8/2007 | Dapper |
| 2007/0274477 | A1 | 11/2007 | Chen |
| 2012/0032855 | A1 | 2/2012 | Reede et al. |
| 2012/0276921 | A1 | 11/2012 | Németh |
| 2013/0343490 | A1 | 12/2013 | Wertz et al. |
| 2014/0192729 | A1 | 7/2014 | Kim et al. |
| 2014/0270032 | A1 | 9/2014 | Liu et al. |
| 2014/0301494 | A1 | 10/2014 | Hsu et al. |
| 2015/0215880 | A1 | 7/2015 | Rafique et al. |
| 2016/0057565 | A1 | 2/2016 | Gold |
| 2016/0113013 | A1 | 4/2016 | Dark et al. |
| 2016/0218833 | A1 | 7/2016 | Sapio et al. |
| 2016/0323886 | A1 | 11/2016 | Luna et al. |
| 2017/0127403 | A1 | 5/2017 | Sapio et al. |
| 2017/0153323 | A1 | 6/2017 | Luna et al. |
| 2017/0251390 | A1 | 8/2017 | Gold et al. |
| 2017/0263032 | A1 | 9/2017 | Cricri et al. |
| 2018/0139565 | A1 | 5/2018 | Norris et al. |
| 2018/0157330 | A1 | 6/2018 | Gu et al. |
| 2018/0367942 | A1 | 12/2018 | Bloechl et al. |
| 2018/0367973 | A1 | 12/2018 | Bloechl et al. |
| 2018/0368206 | A1 | 12/2018 | Wohler et al. |
| 2019/0124474 | A1 | 4/2019 | Bloechl et al. |
| 2019/0159109 | A1 | 5/2019 | Bloechl et al. |
| 2019/0253282 | A1 | 8/2019 | Hadaschik et al. |
| 2020/0022607 | A1 | 1/2020 | Pratt et al. |
| 2020/0028530 | A1 | 1/2020 | Shapira et al. |
| 2020/0053719 | A1 | 2/2020 | Sadiq et al. |
| 2020/0113006 | A1 | 4/2020 | Bloechl et al. |
| 2020/0178054 | A1 | 6/2020 | Simileysky |
| 2021/0289364 | A1* | 9/2021 | Patel ................. H04W 72/1242 |
| 2021/0410149 | A1* | 12/2021 | Xia ................... H04W 72/1242 |

OTHER PUBLICATIONS

U.S. Appl. No. 17/036,079, filed Sep. 2020, Bloechl et al.

Gustafsson et al., "Positioning using time-difference of arrival measurements," Proceedings of International Conference on Acoustics, Speech and Signaling Processing, vol. 6, pp. 553-556, Apr. 2003.

International Search Report and Written Opinion issued in application No. PCT/US2021/043621, dated Jan. 4, 2022.

Unknown, "Bluetooth Core Specification v5.1 Feature Overview," https://www.bluetooth.com/wp-content/uploads/2019/03/1901_Feature_Overview_Brief_FINAL.pdf, Jan. 2019, retrieved on Sep. 25, 2020.

International Search Report and Written Opinion issued in application No. PCT/US2021/043626, dated Jan. 5, 2022.

\* cited by examiner

SYSTEM AND METHOD FOR GENERATING PHASE-COHERENT SIGNALING VIA CALIBRATED PHASE SYNCHRONIZATION FACTORS AMONG WIRELESS RANGING NODES IN A PHASE-BASED TIME DIFFERENCE OF ARRIVAL FRAMEWORK

FIELD OF THE DISCLOSURE

Disclosed embodiments relate to wireless communications systems and the operation thereof, and more specifically, to the generation of phase-coherent signaling based on calibration of phase values among ranging nodes in a phase-based Time Difference of Arrival (TDOA) framework so as to substantially eliminate an effect of multipath interference upon coordinate location determination.

BACKGROUND

Many different applications exist which require the physical location of objects to be determined and/or tracked over time. Examples include asset tracking solutions such as those deployed in hospitals, warehouses, manufacturing facilities and construction locations. Other solutions involve the tracking of people such as in assisted living facilities or various work environments where knowing the physical location of people over time and/or at the current moment is an important characteristic of overall performance.

These applications, often referred to as "Real Time Location Systems" or "RTLS", are used in any number of scenarios in which the location of one or more physical objects are tracked over time. Typically, the objects being tracked are "tagged" with small wireless capable tags that are attached to the object(s) being tracked. These tags are ideally low cost and transmit using a low power protocol, such as Bluetooth or Bluetooth Low Energy (BLE) or other such a protocol having characteristic low power drain.

Object tracking applications are typically implemented using a user interface which shows the location of the tags in real time in graphical form or via some other reporting format. Location determination of the tags as they move around may be accomplished via various ranging techniques in which the distance between the tag and one or more system components (herein generically referred to as a "beacon") is determined. The RTLS generally require use of multiple beacons when arriving at the location determination(s). These locations are collectively used to calculate a real time geographical position for the tag, and thus a position for the object(s) being tracked as a result of being attached to or otherwise in the immediate physical vicinity of the tag.

In some RTLS systems, one or more beacons "advertise" their presence via periodic wireless transmissions and when a location determination is required, a predetermined handshaking process occurs between the tag and the beacons with respect to the tag undertakes determination of ranging to a respective beacon or beacons and its location determination based thereon. Alternatively, other RTLS systems function such that the tag instead advertises its presence to the beacon and initiates the handshaking protocol when a location determination is required.

As one might imagine, accurate location determination for objects in these RTLS systems is directly dependent on the accuracy of the ranging values calculated between the tags and each of the beacons. In some systems, a minimum of four (4) beacon-tag ranges is preferred in order to establish a confident geographic coordinate for the tag. If even one of the ranges calculated diverges even minimally from the actual value, the location estimation for the tag can be unusably inaccurate. By way of example, in a hospital environment, while it may not be a requirement to know exactly where in the room a specific piece of equipment is located, at least knowing which room the equipment is in would typically be a minimum requirement. If ranging error is significant enough, the wrong room for a piece of equipment could be reported.

Ranging errors can be caused by a number of factors including environmental conditions such as noise, multipath channel effects, i.e., multipath interference, clock synchronization and sampling artifacts. Time synchronization and frequency accuracy, or lack thereof, as between the tag and the beacons, can significantly affect ranging accuracy because of the high rate of radio wave propagation. As a result, even small timing errors can cause very significant ranging errors.

In referring to FIG. 1, it has been observed that multipath interference may ordinarily occur among a plurality of beacons, e.g., a master beacon (MB) and one or more slave beacons (SBs) of a given beacon pod, which serve to provide ranging data to be used by the tag T. The interference, as may be understood, is due to reflections off of any one or more of given solid objects R in a vicinity of the beacons' disposition. Since such disposition may oftentimes be inflexible, multipath Mp may often occur as between beacons, yet not between the beacons and tag. As such, Mp artifacts may infiltrate ranging data to be used by the tag when calculating its location. For example, and with reference to FIG. 2, disparities p* (as derived from phase shift determinations among beacon signaling) may likely skew a determination of true peak $P_{TRUE}$ which may be indicative of an actual path length difference (PLD) as between beacon signaling to the tag. Thus, it will be understood that such disparities may inevitably impair the tag's ability to directly correlate beacon signaling and thus achievement of determination of its coordinate location. See, for example, commonly owned U.S. Pat. No. 10,986,467, entitled "Apparatus and Method for Geolocating a Tag Relative to a Threshold Via Phase-Based Time Difference of Arrival Framework," the entirety of which is hereby incorporated by reference, explaining calculation of ranging data based on phase shift.

Relative to the various paradigms for determining ranging, including, for example, Time of Flight (ToF) and Time Difference of Arrival (TDOA), phase, i.e., the angular relationship among transmitted and received signaling for a given frequency and measured time period, may be assessed to determine usable ranging data. Sources of ranging error such as lack of timing synchronization and frequency offset, as discussed above and when existing between transmitted and received signaling, directly effect shift in the aforementioned phase. In other words, phase shift and multipath Mp, when left unaddressed, may skew opportunity to obtain usable ranging data based on implementation of ToF and TDOA frameworks, and also, therefore, an ability to accurately calculate a geographical position of a tag.

In this regard, data compiled when the above frameworks are implemented may be manipulated and/or evaluated to negate the effect of phase shift on applicable ranging measurement data. To do so, however, system transmission components may be required to effectively cooperate to achieve viable phase coherence, i.e., constant or same phase shift, for signaling capable of producing ranging measurement data.

In view of such cooperation, however, it would also be advantageous to account for or reconcile such Mp and phase shift, as between beacons, with greater independence among the system transmission components. Doing so, it will be understood, will enhance analysis of signal transmission, and thus increase accuracy in the geolocation of the tag. This way, an optimized RTLS may be deployed to provide any or all of the following, including, for example, proximity sensing, alert systems, jobsite and warehouse asset monitoring, and tracking of assets to be inventoried and for which location must be determined.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An embodiment may include a system for generating phase-coherent wireless signaling, including a master beacon (MB) and a slave beacon (SB) each configured to engage in bidirectional wireless communications across channels of a given frequency band, the communications being initiated by the SB in response to detection of an advertisement from the MB, and via transmission to the MB of a first Constant Tone (CT) at each of the channels. In these regards, at each channel, the SB may (a) receive a second CT from the MB in response to receipt by the MB of the first CT, and sample each second CT in in-phase and quadrature (IQ) format, (b) store each IQ sample according to the respective channel therefor, and (c) based on the stored IQ samples, calculate and store a set of one-way channel phase values each defining a calibration factor for calibrating a local oscillator (LO) of the SB to that of the MB.

A further embodiment may include a method in accordance with the aforementioned system.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
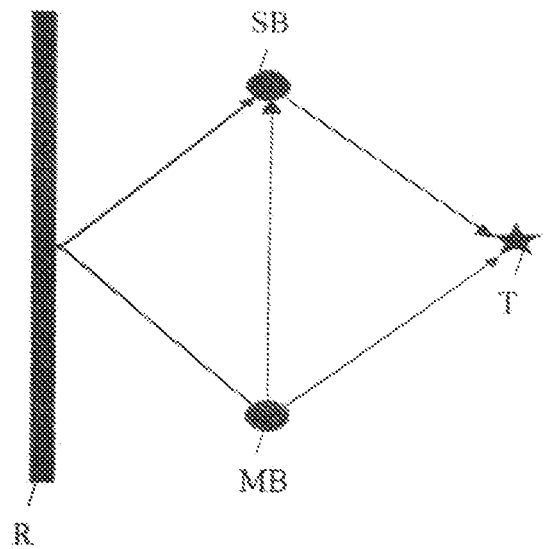
FIG. 1 is an illustration of related and background art as to an occurrence of multipath interference Mp among beacons disposed to enable ranging to a tag.
Figure 2:
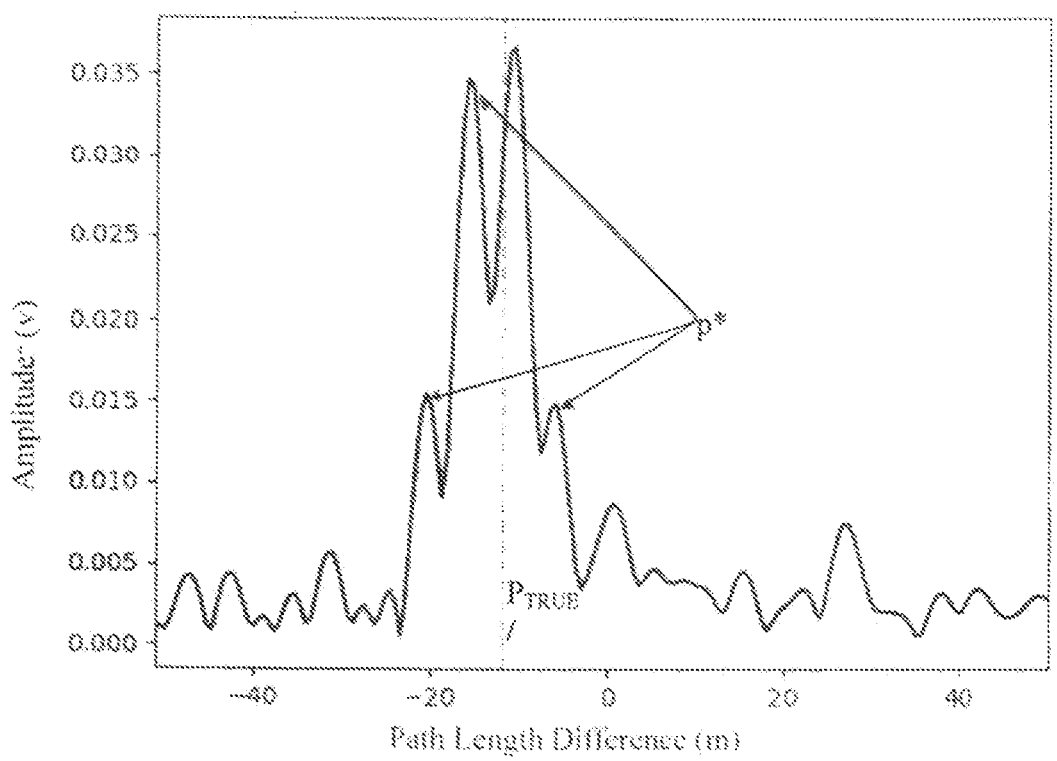
FIG. 2 is an illustration of related and background art as to a range difference correlation curve (RDCC) demonstrating an effect of the Mp according to FIG. 1 in which ranging data including path length difference (PLD) is demonstrated as being skewed as a result of the Mp.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, LTE, CBRS, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Bluetooth Low Energy (BLE) networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point, or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Figure 3:
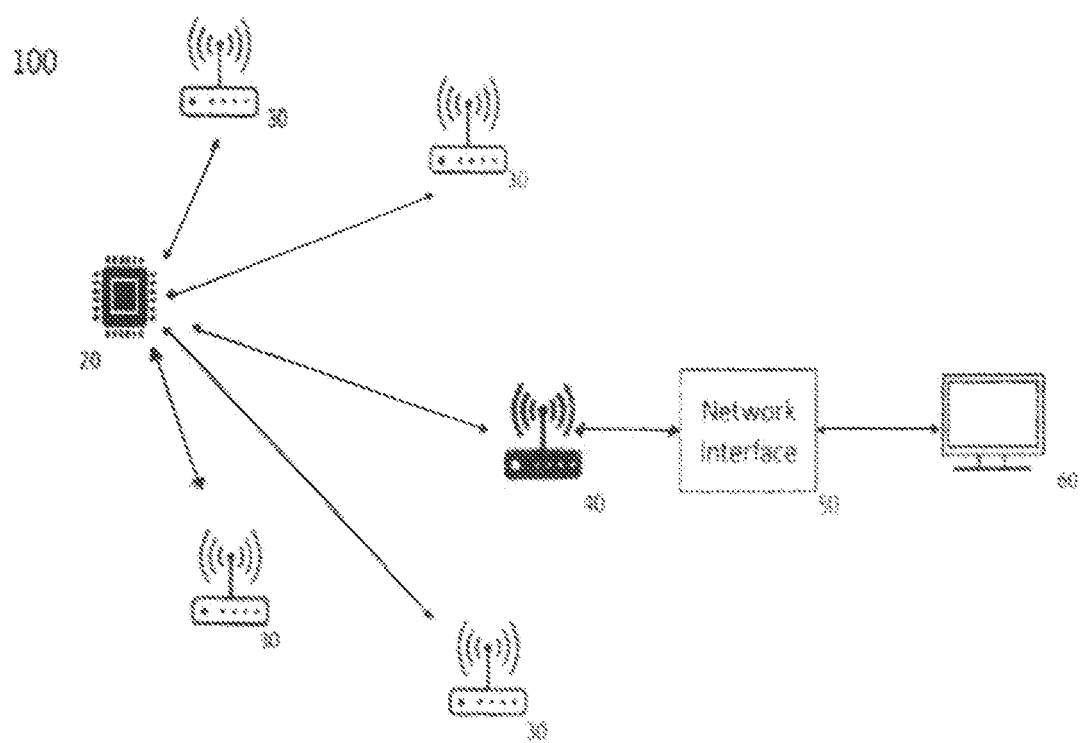
FIG. 3 is an illustration of a network providing wireless communications in accordance with embodiments herein.

Embodiments herein may encompass signaling on either a BLE network, or another wireless network so as to demonstrate implementation of the herein discussed phase-coherent signaling, i.e., signaling having constant or same phase shift. Turning now to FIG. 3, a description of the system 100 according to an embodiment is provided.

System 100 and its components may be configured to be operable in accordance with BLE protocol, such that each of the aforementioned components are configured for BLE communications. System 100 typically includes multiple tags 20—only one is shown in FIG. 3 for clarity. Tag 20 may be attached to or associated with a particular object for the purposes of tracking a changing location of that object. Tags 20 are capable of wirelessly communicating with other components of system 100 as more fully described herein. System 100 also includes a plurality of beacons 30 which also communicate wirelessly with other components of system 100 such as with tags 20. Beacons 30 are located at very specific geographic coordinates within the area within which objects are to be tracked. Beacons 30 are installed in these locations and during the time of installation, their specific locations are entered into system 100 so that system 100 is always aware of the known exact physical locations of each such beacon 30.

System 100 may also include one or more access points 40. These access points 40 may also serve in the same capacity as beacons 30 in that their location is known to system 100 and such that they may communicate with tags 20 as described herein for the purpose of location determination as more fully described herein. In addition, access points 40, if present, also provide a connection to network interface 50 which permits data to be shared with and received from other networks such as the internet. This functionality may alternatively be provided by one or more beacons 30 in lieu of access point 40. In one embodiment, data is transmitted and received via backhaul to the internet such that a cloud based application may be accessed by a user via client 60 to view object location information and also to allow the user to configure various aspects related to the functionality of system 100.

Tags 20 are responsible for executing any coordinate location determination process locally and then reporting the location determination to system 100 via a communication to an access point 40 (or a beacon 30).

Figure 4:
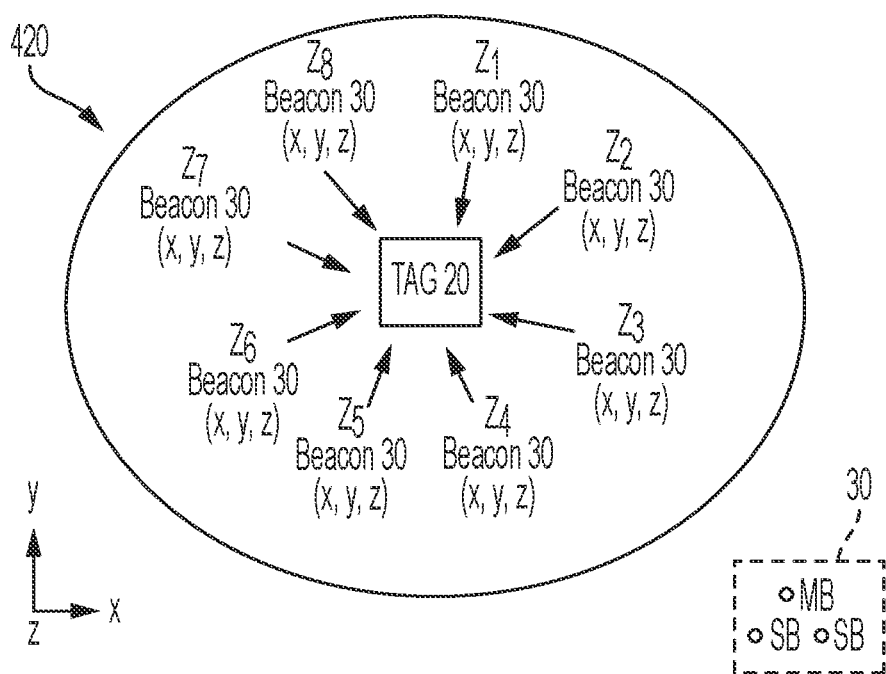
FIG. 4 is an illustration of an area configuration of beacons relative to which a tag may determine its coordinate location relative to such beacons, according to embodiments herein.

With reference now to FIG. 4, a description of the communication protocol among a tag 20 and beacons 30 within system 100 and according to an embodiment is provided. Accordingly, tag 20 may be configured to interact with one or more beacons 30 disposed throughout zones Z1-Z8, for example, to receive wireless communications from the beacons 30 and to establish its coordinate location in accordance with a phase-based Time Difference of Arrival (TDOA) framework. As such, each of such communications may be characterized by Constant Tone (CT), i.e., a Continuous Wave Tone. In other words, communications sent by at least one of the beacons 30 may include such a CT at, for example, the carrier frequency or at an offset of, for example, 250 kHz. Such CT may be sampled by each tag 20 in IQ, or quadrature, format. That is, such sampling may be understood wherein I represents the amplitude of an in-phase carrier, and Q represents the amplitude of the quadrature-phase carrier. The sampling may be carried out by the tag 20, as discussed below.

Additionally, IQ sampling may occur with respect to wireless communications as between multiple ones of beacons 30, as discussed herein. In this respect, each one of beacons 30 may assume a pod configuration including members disposed therein in a master-slave relationship. In particular, each such pod may include at least one first or master beacon (MB) and at least two (2) second or slave beacons (SBs).

It will be understood that each of the tags 20 and beacons 30 may be equipped with all of the necessary hardware and/or software necessary for executing the aforementioned CT enabled communications, as well as the IQ sampling in connection therewith. It will also be understood that each of the tags 20 and beacons 30 may be equipped with all of the necessary hardware and/or software for executing the herein discussed calibration, phase synchronization, ranging, and location determination operations, as applicable and as related to an exchange of CT enabled communications.

As described below, in an effort to achieve phase coherence as between signaling between a SB and a MB, each may engage in TOF sequences to enable the SB to calibrate its local oscillator (LO) to that of the MB when each of the SB and the MB engage in TDOA sequencing with the tag 20.

In a case in which each of the SB and MB engage in bi-directional, i.e., two-way, communications, as in a TOF scenario, for instance, SB may perform a scan within setting 420 to detect those MBs that are enabled to transmit the CT, as will be identified by encoding within a respectively transmitted and received beacon advertisement message from a MB. Upon detection, the SB may initiate a connection with the first detected MB, and transmit signaling in response to the beacon advertisement message received from the MB. In particular, one or more portions of the response signal, as transmitted, may be described by the following:

$$e^{j(\omega_{SB} t + \varphi_{SB})}, \text{ in which } SB$$

e is Euler's number,
j is the square root of −1,
$\omega_{SB}$ is the angular frequency of the SB's signal, and
$\varphi_{SB}$ is an arbitrary phase shift of the SB's signal.

The response may then be received by the MB as the following:

$$e^{j(\omega_{SB} t + \varphi_{SB}(f,r))}, \text{ in which}$$

$\varphi_{SBMB}(f,r)$ is the phase shift introduced during propagation from the SB to the MB, and given as a function of frequency (f) and range (r) by $\varphi(f,r) = -2\pi f r/c$, where c is the speed of light.

The aforementioned responsive, bi-directional signaling as initiated by a SB may be transmitted in response to the SB detecting from the MB advertisement a calibration flag for the purpose of calibrating the local oscillator (LO) of the SB to that of the MB. In this way, the calibration flag serves as a trigger for two-way communications between only the SB and MB, and which are akin to a TOF exchange but different in that the SB does not execute a ranging measurement (though such capability is contemplated). That is, the tag 20 lays dormant upon receipt of a MB advertisement containing the calibration flag, while the SB and MB communications are executed for the purpose of enabling the SB to calibrate its LO phase to that of the MB so as to enable the SB to thwart an effect of multipath interference Mp (as between the MB and the SB) when transmitting its signaling to a tag 20 during TDOA ranging sequences.

Figure 5:
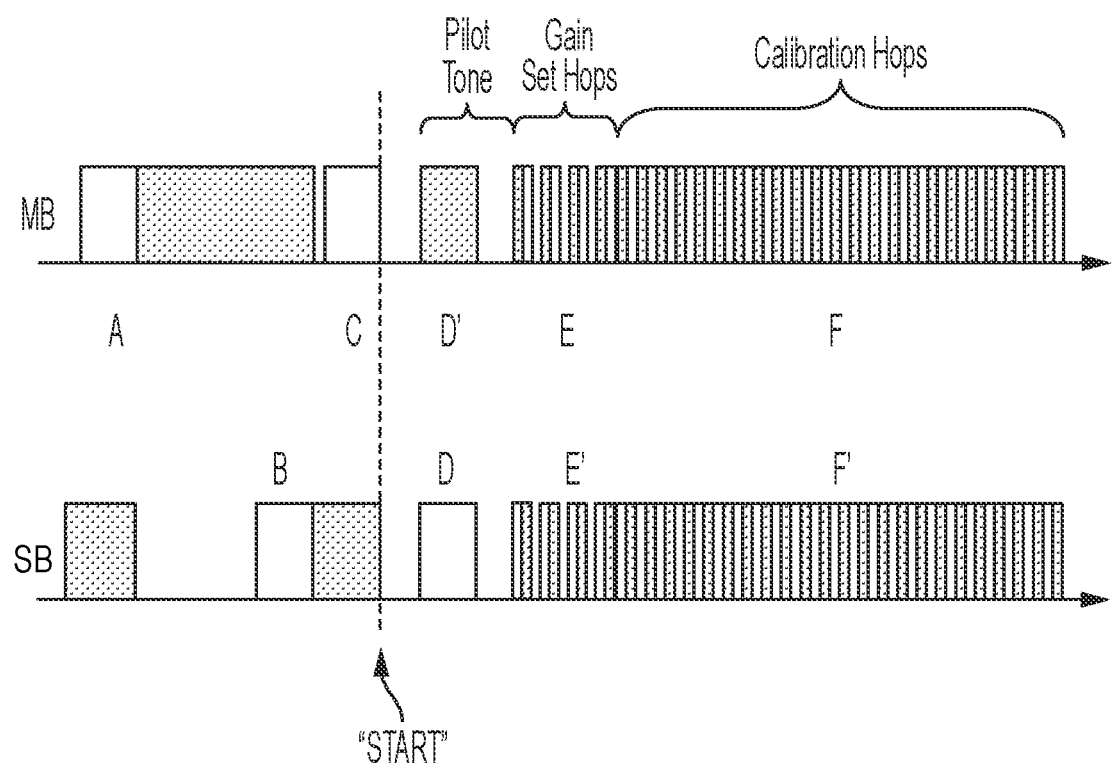
FIG. 5 is a schematic diagram of a calibration sequence in accordance Time of Flight (ToF) protocol, according to embodiments herein.
Figure 7:
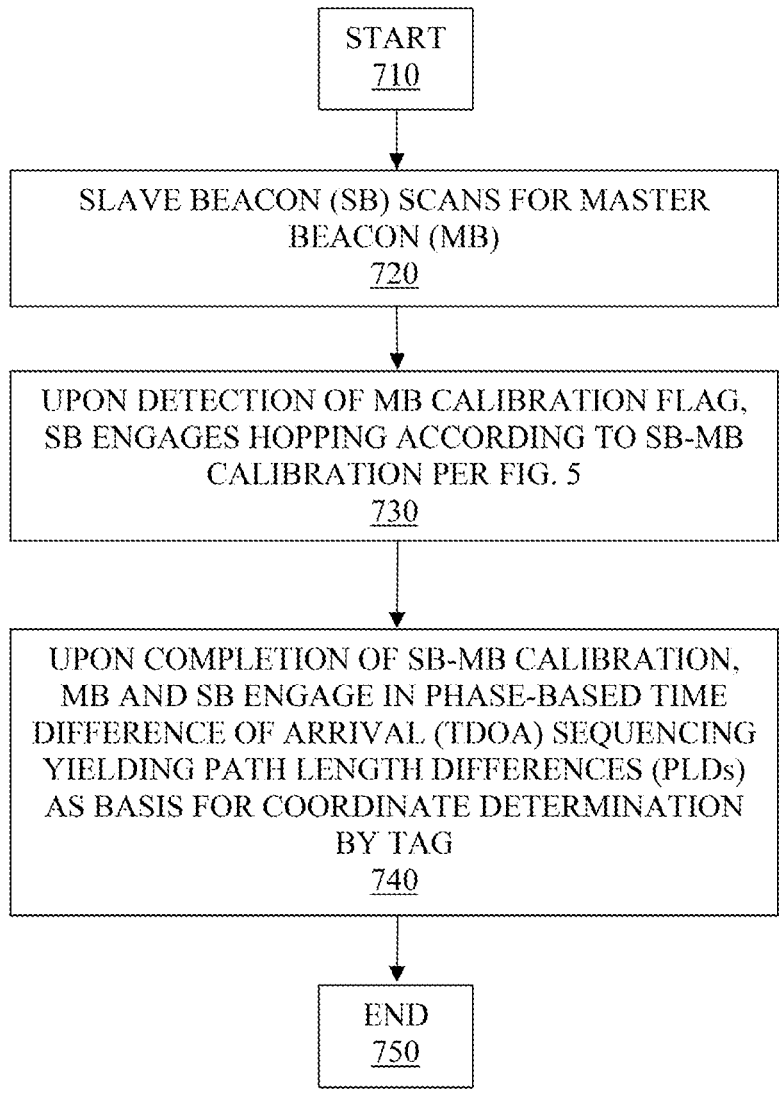
FIG. 7 is a sequence diagram illustrating wireless communication between a tag and one or more beacons for establishing ranging data in accordance with FIG. 6.

As such, and when referring to FIGS. 5 and 7, there is illustrated a calibration protocol between a SB and a MB, i.e., with respect to bi-directional communications therebetween across given channels of an exemplary wireless communications band, e.g., BLE.

A description of the process for initiating and exchanging CTs between a SB and a MB that enables the noted calibration to occur is now provided. The first step is for the MB to transmit an advertisement message to all SBs within range. This is represented at "A" on the MB timeline at the top (see also step 710). Such messages are periodically and repetitively transmitted until such time as acknowledged by a respectively designated SB (as identified in the MB's advertisement according to the pod configuration thereof).

The acknowledgement may comprise a request by the identified SB to begin the calibration process in response to the SB detecting from the MB advertisement a calibration flag indicating that the purpose of the advertisement is phase calibration with the particularly identified SB (see step 720) via, for instance, its media access control (MAC) address. This acknowledgement and request is represented at "B" on the timeline for the SB.

Upon receipt of the request, MB then acknowledges the request at "C" by sending an acknowledgement message to the SB. Following this, SB sends a pilot signal (defining a single CT) to the MB at "D," to enable the MB to detect offset between local oscillator (LO) frequencies corresponding to the SB and the MB, and to synchronize frequency with the SB at "D'." In accordance with this CT and resulting synchronization, the MB and the SB may then engage in a series of hops, at E and E', so that each of the MB and the SB may set its relative gain. Substantially simultaneously with transmission of the pilot signal, the SB sends a "Start" message to the MB to initiate the timing that ought to control the calibration process and begin following gain setting at the MB and/or the SB. This message starts the hop frame timer which allows the MB and the SB to synchronize timing for the series of CT calibration hops which is about to come. In particular, the LOs for both the SB and the MB must remain in synch and locked during the duration of each hop, i.e., the LOs may lay dormant in between hops. In a preferred embodiment of the invention, a BLE chip manufactured by Nordic Semiconductor, such as the nRF52833 Bluetooth v4.2 and BT5 chip may be employed in both the MB and the SB to provide PPI (Programmable Peripheral Interconnect) and LO capabilities as desirable for implementing the teachings provided by the embodiments herein.

As noted, once the start message is received by the MB, the hop frame timer is triggered for both the MB and the SB via, for example a PPI interface. Once synchronized and gain has been set, the SB and the MB begin to exchange CT tones across the given frequency band for the purpose of generating signaling to enable the SB to establish a set, i.e., library, of phase response calibration factors to be used in calibrating its LO with that of the MB during TDOA sequencing with the tag 20 (see step 730). This is shown as across the set of boxes corresponding to "F" for the MB and as similarly illustrated with respect to the SB at "F'," and referred to hereinafter as SB-MB calibration, in accordance with the exemplary calibration hops, as shown. That is, the SB may initiate a respective exchange for a given channel with a first CT, and receive from the MB a second CT thereof. In one embodiment, the band is traversed with a 1 MHz sample rate across a 100 MHz bandwidth, resulting in 100 tone exchanges to be made, although more or less samples could be used across a wider or narrower band and/or in a different licensed or unlicensed band without departing from the scope or spirit of the embodiments herein. At the conclusion of the SB-MB calibration and before ending the SB-MB operations at step 750, each of the SB and the MB may thereafter engage in TDOA sequencing, at step 740, to enable the tag 20 to ascertain relative phase shift as to their signaling and corresponding PLD with respect to the tag 20 as basis for its determination of a respective coordinate location within space 420.

Figure 6:
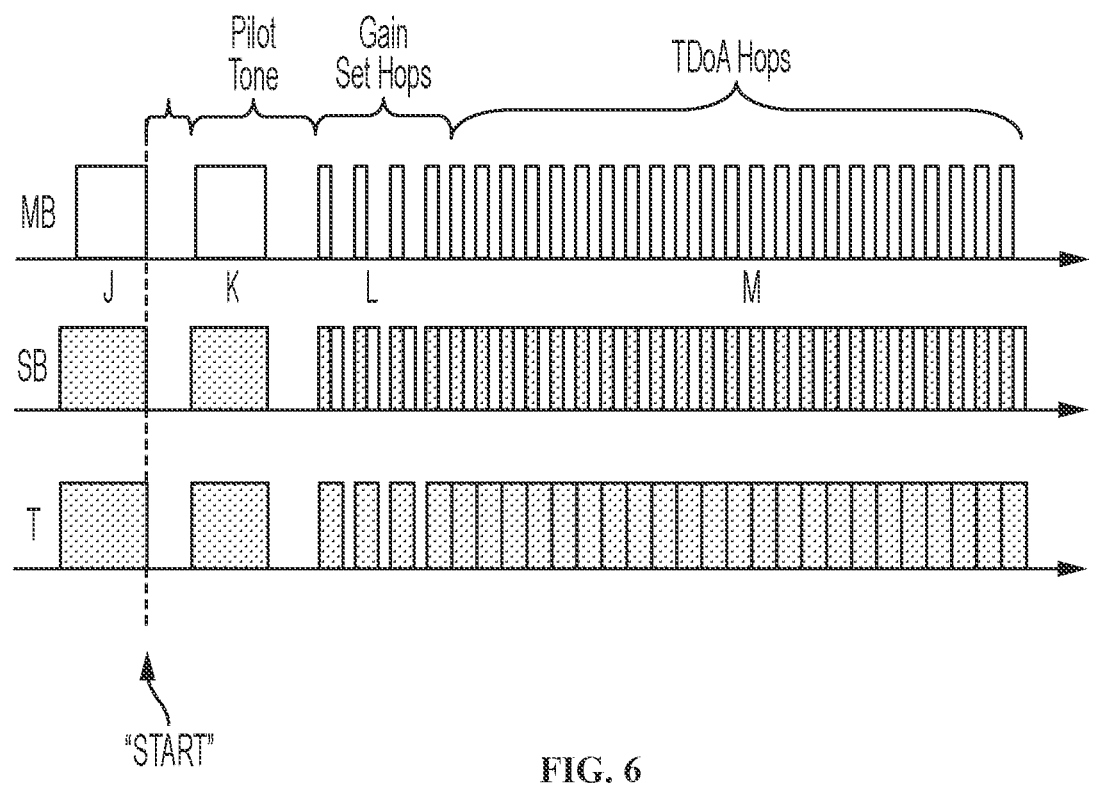
FIG. 6 is a schematic diagram of a ranging protocol for Time Distance of Arrival (TDOA) measurement accounting for phase shift differential, according to embodiments herein.

In general, and with reference to FIG. 6, there is illustrated a ranging protocol for TDOA measurement between a tag 20 and a beacon 30 or beacon 30 pod, i.e., one-way communications from the beacon 30 to the tag 20 in order to determine a range therebetween. In such protocol, beacon pods are provided and consist of three or more beacons including at least one master beacon MB and at least two or more slave beacons SBs. Similar to the SB-MB two-way calibration protocol of FIG. 5, an advertisement message including a CT is transmitted at "J" and followed by transmission of a pilot signal at "K," as well as gain setting and ranging hops at "L" and "M," respectively. Unlike the discussed calibration protocol, however, the MB initiates the ranging protocol with respect to each of slave beacons SBs within their given pod. In this way, (a) due to the absence of the calibration flag in a given MB advertisement, the SB is then configured to engage in the ranging protocol, and (b) the tag 20 is left to merely listen for advertisement messages transmitted from each of the MB and SBs for a respective pod. As between a MB and SBs, the MB advertisement message includes position information defined by its coordinates and those of SBs within its pod, as well as predetermined timing for transmission of advertisement messages from SBs to the tag 20, which is offset from a transmission timing attributable to the MB.

Figure 8:
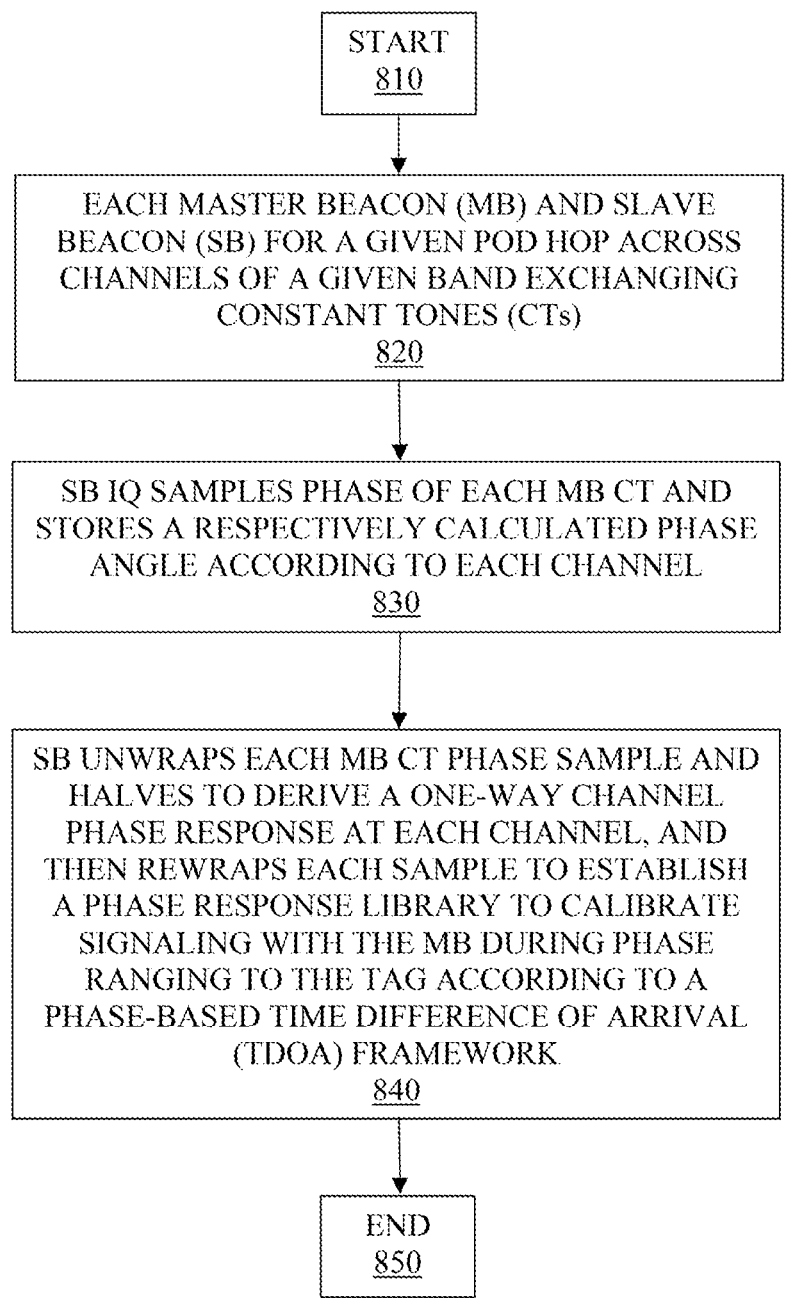
FIG. 8 is a sequence diagram illustrating a manner of calibrating a phase value of a slave beacon (SB) to that of a master beacon (MB) according to TOF sequencing as per FIG. 5.

In referring to FIG. 8, there is illustrated in more detail the manner of establishing the phase calibration factor at the SB in accordance with step 730 of FIG. 7. In particular, the process may begin at step 810 and proceed to step 820 whereat each MB and SB hop across channels of the selected band to exchange CTs thereacross. The CT may be the same or different for a respective channel, and be given by the following, in which $Z_{SBMB}$ indicates transmission of a CT from a SB to a MB and $$Z_{SBMB}=e^{-j(\omega_{MB} t_0+\varphi_{MB})}e^{j(\omega_{SB}t_0+\varphi_{SB}+\varphi_{SBMB}+\varphi_m)}=$$
$$e^{j(\Delta\omega t_0-\varphi_{MB}+\varphi_{SB}+\varphi_{SBMB}+\varphi_m)}$$

wherein
$\omega_{SB}$ and $\varphi_{SB}$ respectively represent the SB's LO angular frequency and phase;
$\omega_{MB}$ and $\varphi_{MB}$ respectively represent the MB's LO angular frequency and phase;
$\Delta\omega t_0$ approximates 0 as each of the SB and MB LOs are synchronized (as discussed above, i.e., prior to their exchange of tones);
$t_0$ represents the reception time of the CT at the MB;
$\varphi_m$ represents multipath interference between the SB and the MB; and
$\varphi_{SBMB}$ represents a phase shift of the CT while travelling a distance d between from the SB to the MB, and is given by:

$$\varphi_{SBMB} = \frac{\omega_{SB} \cdot d}{c}.$$

At each channel, the SB, as shown at step 830, IQ samples each MB CT, in response to $Z_{SBMB}$, as $Z_{MBSB}$ and stores each sample for each channel of the band. Based on these stored samples, the SB further calculates therefrom a respective phase angle, e.g., $\angle Z_{MBSB}$ radians, and associates the same to its stored sample.

At this stage, the SB has compiled a library of two-way channel phase responses given the two-way communications according to the SB-MB calibration as discussed above. As such, and as is understood that phrase repeats modulo-$2\pi$, it is necessary to, at step 840, unwrap the two-way responses (see Itoh, Kazuyoshi. (1982). Analysis of the phase unwrapping problem. Applied optics. 21. 2470. 10.1364/AO.21.002470, for exemplary unwrapping technique(s)) and halve those responses so as to derive, upon re-wrapping, a one-way channel response which may be applicable during TDOA sequencing as between the SB and the tag 20. Thus, upon the conclusion of the SB-MB calibration, as indicated at step 850, the SB has compiled a library of one-way channel phase response values defining respective channel calibration factors for use in TDOA sequencing with the tag 20. Each such factor may be a function of the propagation phase shift as between the MB and the SB as well as the Mp component $\varphi_m$ so as to be given by the following:

$$Z_{cal}=e^{j(\Phi_{MBSB}+\phi_m)}, \text{ and measured as } \angle Z_{cal} \text{ radians.}$$

As has been discussed above, transmissions from the MB to the SB may often occasion instances of multipath interference Mp such that signaling of a CT received at the SB may be given by the following:

$$Z_{MBSB}=e^{j(\omega_{SB}t+\varphi_{SB})}e^{j(\omega_{MB}t+\varphi_{MB}+\varphi_{MBSB}+\varphi_m)}\approx$$
$$e^{j(\varphi_{MB}-\varphi_{SB}+\varphi_{MBSB}+\varphi_m)}, \text{ given } \omega_{MB}\cong\omega_{SB}.$$

Figure 9:
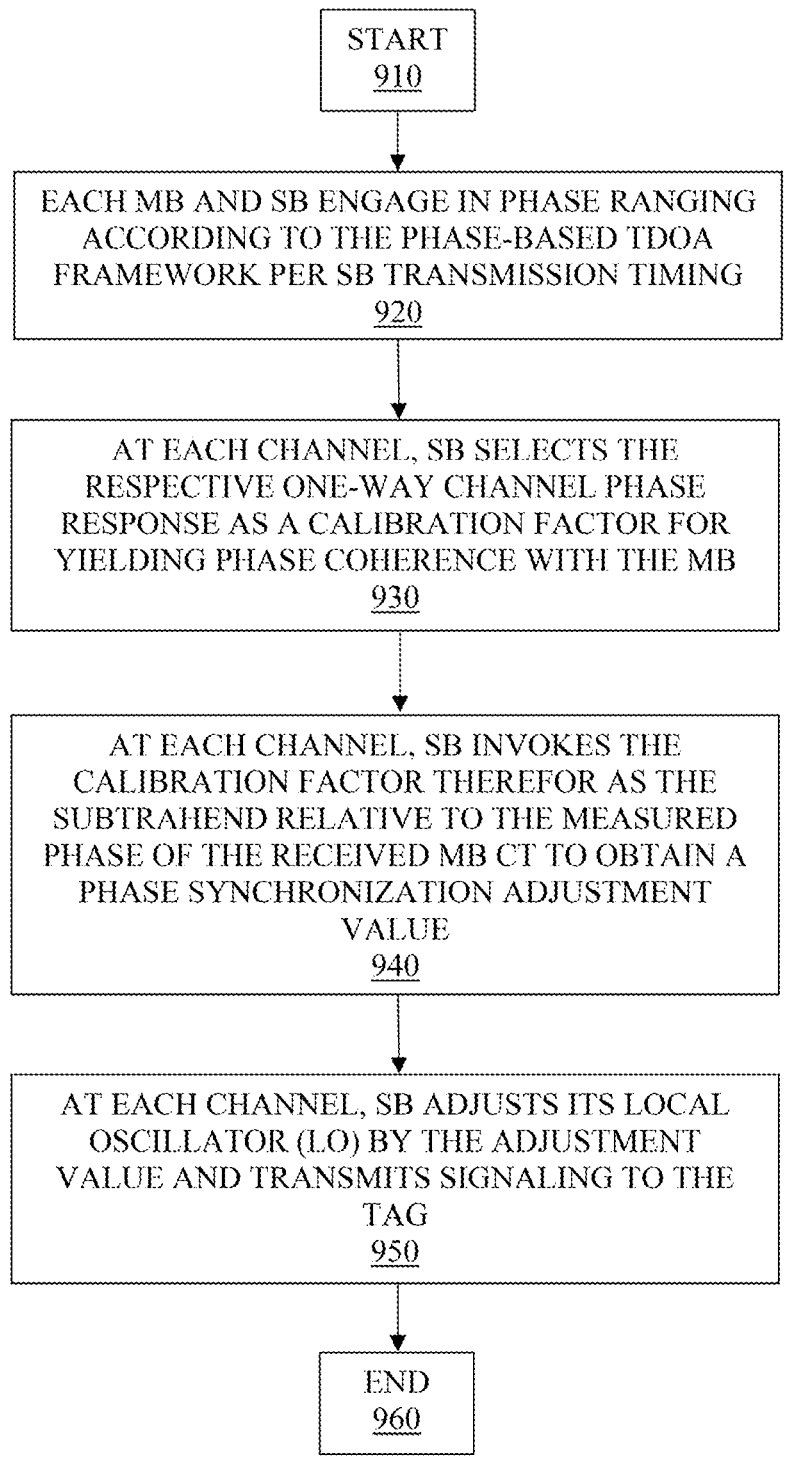
FIG. 9 is a sequence diagram illustrating a manner of establishing phase-coherent signaling among the SB and the MB according to FIG. 8 so as to enable TDOA ranging with respect to the tag.

That is, and with reference to FIG. 9, TDOA sequencing as between each of the MB, SB, and tag 20 may be initiated at steps 910-920 by a MB advertisement, whereat $Z_{MBSB}$ may be received by the indicated pod SB to include the Mp component $\varphi_m$. In other words, the absence of the above-discussed calibration flag in the MB advertisement triggers signaling by the tag 20 to the beacon 30 pod, thus causing the MB of such pod to begin phase-based TDOA ranging therefor.

So as to account for, i.e., substantially remove, the phase shift resulting from Mp experienced in transmission from the MB to the SB, the SB draws upon its library of catalogued listing of phase response calibration factors for the respective communications channel. More specifically, the SB invokes, as at 940, the respective calibration factor for a given channel as the subtrahend relative to the measured $\angle Z_{MBSB}$. This way, phase coherence between the MB and the SB may be given by the following:

$$\angle Z_{MBSB} - \angle Z_{cal} = \varphi_{MB} - \varphi_{SB} + \varphi_{MBSB} + \varphi_m - \varphi_{MBSB} - \varphi_m = P_{MB} - \varphi_{SB} = \Delta LO_{MB/SB},$$

wherein $\Delta LO_{MB/SB}$ represents the difference in phase values as between the LOs of the MB and the SB so as to define a phase synchronization adjustment value for a given channel.

Thus, as may be appreciated, invocation of $Z_{cal}$ as against $Z_{MBSB}$ substantially eliminates not only the phase shift attributable to multipath interference Mp, but also that which is attributable to propagation between the MB and the SB. Accordingly, the SB is now equipped to, prior to ending its TDOA sequence for a given channel at step 960, adjust its LO by $\Delta LO_{MB/SB}$ at step 950 to achieve phase coherence with the MB. Samples thus received from the SB at the tag 20 as a third CT given by $Z_{SBT} = e^{j(\omega_{SB}t + \varphi_{MB} + \varphi_{SB}T)}$ may then be directly correlated to an appropriate path length by the tag 20.

Thus, relative to signaling from the MB being received by the tag 20 as $Z_{MBT} = e^{j(\omega_{MB}t + \varphi_{MB} + \varphi_{MB}T)}$, assuming $\omega_{MB} \approx \omega_{SB} \approx \omega_T$, the tag 20 may then proceed to, with respect to received samples across the given band, may determine ranging data as between the MB and each SB by (a) conducting IQ sampling of each of a received signal from a MB and a SB and sort the same into channel or frequency order, whereupon IQ samples may be correlated one-to-one in terms of MB and SB pairs for processing, (b) windowing the samples, according to Hanning or Blackman-Harris, (c) zero-padding the same to a power of two (2), nominally 128, and (d) invoking an Inverse Fast Fourier Transform (IFFT) to derive a range difference correlation curve (RDCC) correlating a phase shift as between the MB and the SB to a path length difference (PLD). Once such processing is complete, a gradient descent analysis may then be conducted by the tag 20, based on the peaks p of each of the RDCCs and the respective position data corresponding to the MB and the SB, to determine its coordinate location. See, for example, U.S. Pat. No. 10,986,467, entitled "Apparatus and Method for Geolocating a Tag Relative to a Threshold Via Phase-Based Time Difference of Arrival Framework," the entirety of which is hereby incorporated by reference, explaining calculation of ranging data based on phase shift in the context of TDOA measurement.

Figure 10A:
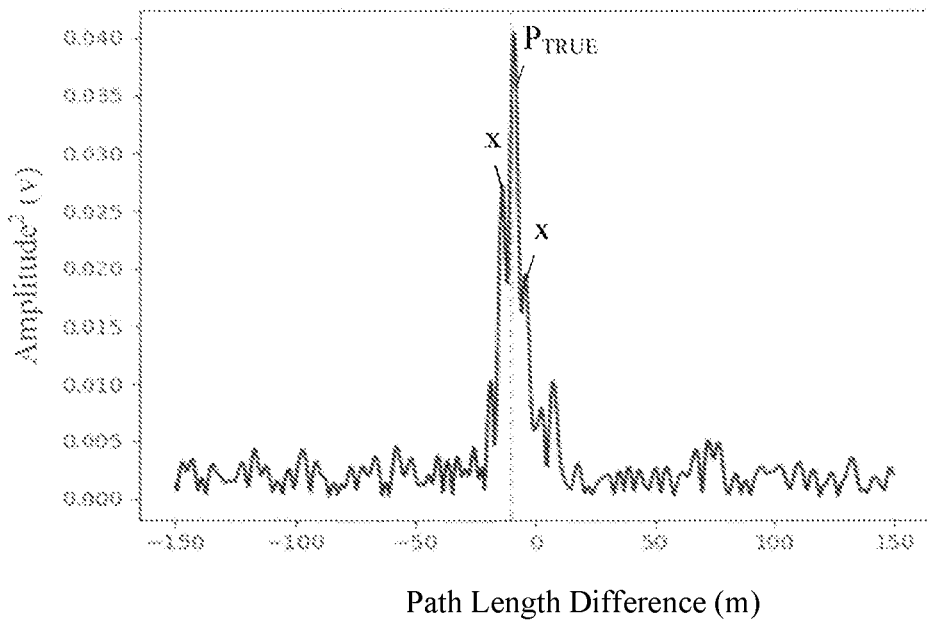
FIGS. 10A and 10B respectively illustrate RDCCs without and with phase calibration as to be invoked by an SB according to embodiments herein.
Figure 10B:
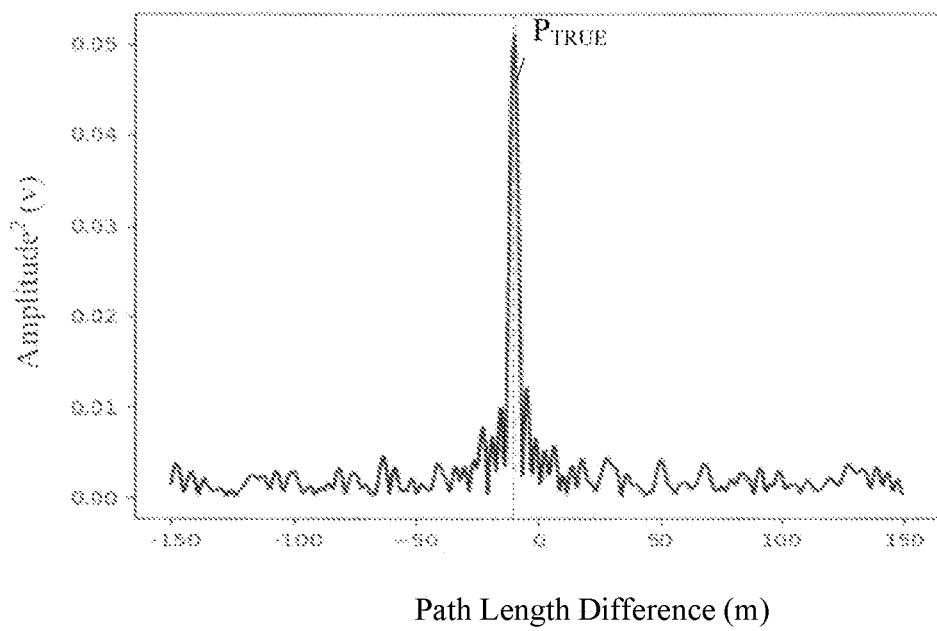

In referring to FIGS. 10A and 10B, there are provided comparative examples of RDCCs, as determined by the tag 20, for signaling as between a MB and a SB in which calibration according to the embodiments herein is demonstrated. For example, and as shown in FIG. 10A in which embodiments herein are not employed, disparities x resulting from multipath as between the MB and the SB are shown as obfuscating a clear determination of the true peak $P_{TRUE}$ on which reliable coordinate determination may be based. In contrast, FIG. 10B illustrates the absence of such disparities when each of the MB and the SB engage in the MB-SB calibration discussed herein, and which, as noted, further substantially eliminates phase shift due to propagation of a CT from a MB to a SB.

U.S. Pat. No. 10,985,787, entitled, "System and Method For Generating Phase-Coherent Signaling When Ranging Between Wireless Communications Nodes," and U.S. Pat. No. 11,105,917, entitled, "System and Method For Generating Phase-Coherent Signaling When Ranging Between Wireless Communications Nodes and To Account For Phase Shift Therebetween" are each incorporated herein by reference in their entireties relative to aspects as are discussed herein other than the provided MB-SB calibration, and provide for manner of providing phase-coherent signaling as between a MB and a SB relative to a tag's determination of its coordinate location. However, as discussed, calibration according to the present embodiments further refines such phase synchronization given the simultaneous and substantial elimination of (1) artifacts due to multipath interference, (2) phase shift owing to propagation, and (3) effect of various radio non-idealities among beacons.

In view of the above, it will be understood that the presently discussed embodiments enable phase coherence among signaling providing basis for the calculation of ranging data between, for example, a tag and one or more beacons in the context of phase-based TDOA measurement. As such, efficacy in calculation of such ranging data at the tag may be heightened since phase coherence may be established remotely, i.e., away from the tag and at a single transmission source such as a beacon. Additionally, and due to an ability of a beacon, such as a SB, to establish such phase coherence, processing burden on the tag is reduced, thus increasing opportunity for extended operating, i.e., battery, capacity when calculating its coordinate location and/or moving between locations.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A system for generating phase-coherent wireless signaling, comprising:
    a master beacon (MB) and a slave beacon (SB) each configured to engage in bidirectional wireless communications across channels of a given frequency band, the communications being initiated by the SB in response to detection of an advertisement from the MB, and via transmission to the MB of a first Constant Tone (CT) at each of the channels,
    wherein
        at each channel, the SB (a) receives a second CT from the MB in response to receipt by the MB of the first CT, and samples each second CT in in-phase and quadrature (IQ) format, (b) stores each IQ sample according to the respective channel therefor, and (c) based on the stored IQ samples, calculates and stores a set of one-way channel phase values each defining a calibration factor for calibrating a local oscillator (LO) of the SB to that of the MB.

2. The system of claim 1, wherein:
the MB advertisement comprises a calibration flag triggering the initiation of the bidirectional communications by the SB.

3. The system of claim 2, wherein:
each stored IQ sample defines a phase angle therefor, and is unwrapped, halved, and re-wrapped by the SB to yield a respective one of the one-way channel phase values.

4. The system of claim 3, wherein:
the respective one of the one-way channel phase values is selected by the SB as the calibration factor for a given channel in response to each of the MB and the SB being configured to conduct phase-based ranging to a tag across the channels of the given frequency band in accordance with a phase-based Time Difference of Arrival (TDOA) framework.

5. The system of claim 4, wherein:
the SB is configured to conduct the phase-based ranging in response to not detecting the calibration flag.

6. The system of claim 5, wherein:
during the phase-based ranging, the SB is configured to measure a phase of a CT transmitted from the MB, and to subtract the calibration factor from the measured phase.

7. The system of claim 6, wherein:
the operation of subtracting the calibration factor from the measured phase defines a phase synchronization adjustment value as between the SB and the MB and by which the SB adjusts the LO thereof for a third CT to be transmitted from the SB during the phase-based ranging with the tag.

8. A method for generating phase-coherent signaling, comprising:
    transmitting an advertisement from a master beacon (MB);
    initiating, by a slave beacon (SB) in response to receipt of the advertisement, bidirectional communications with the MB across channels of a given frequency band via transmission to the MB of a first Constant Tone (CT) at each of the channels,
    wherein
        at each channel, the SB (a) receives a second CT from the MB in response to receipt by the MB of the first CT, and samples each second CT in in-phase and quadrature (IQ) format, (b) stores each IQ sample according to the respective channel therefor, and (c) based on the stored IQ samples, calculates and stores a set of one-way channel phase values each defining a calibration factor for calibrating a local oscillator (LO) of the SB to that of the MB.

9. The method of claim 8, wherein:
the MB advertisement comprises a calibration flag triggering the initiation of the bidirectional communications by the SB.

10. The method of claim 9, wherein:
each stored IQ sample defines a phase angle therefor, and is unwrapped, halved, and re-wrapped by the SB to yield a respective one of the one-way channel phase values.

11. The method of claim 10, wherein:
the respective one of the one-way channel phase values is selected by the SB as the calibration factor for a given channel in response to each of the MB and the SB being configured to conduct ranging to a tag across the channels of the given frequency band in accordance with a phase-based Time Difference of Arrival (TDOA) framework.

12. The method of claim 11, wherein:
the SB is configured to conduct the phase-based ranging in response to not detecting the calibration flag.

13. The method of claim 12, wherein:
during the phase-based ranging, the SB is configured to measure a phase of a CT transmitted from the MB, and to subtract the calibration factor from the measured phase.

14. The method of claim 13, wherein:
the operation of subtracting the calibration factor from the measured phase defines a phase synchronization adjustment value as between the SB and the MB and by which the SB adjusts the LO thereof for a third CT to be transmitted from the SB during the phase-based ranging with the tag.

* * * * *